United States Patent
Noguchi et al.

(10) Patent No.: US 11,597,009 B2
(45) Date of Patent: Mar. 7, 2023

(54) NI—FE BASE ALLOY POWDER, AND METHOD FOR PRODUCING ALLOY COATING USING SAID NI—FE BASE ALLOY POWDER

(71) Applicants: Ebara Corporation, Tokyo (JP); Ebara Environmental Plant Co., Ltd., Tokyo (JP); Dai-Ichi High Frequency Co., Ltd., Tokyo (JP)

(72) Inventors: Manabu Noguchi, Tokyo (JP); Eiji Ishikawa, Tokyo (JP); Eichi Tanaka, Tokyo (JP); Shigenari Hayashi, Hokkaido (JP); Takashi Kogin, Tokyo (JP); Nobuhiro Takasaki, Tokyo (JP); Kenichiro Okutsu, Tokyo (JP); Masaya Kanazawa, Tokyo (JP); Yasuki Miyakoshi, Hokkaido (JP); Hidenori Takahashi, Hokkaido (JP); Suzue Yoneda, Hokkaido (JP); Takayuki Saitou, Hokkaido (JP)

(73) Assignees: Ebara Corporation, Tokyo (JP); Ebara Environmental Plant Co., Ltd., Tokyo (JP); Dai-Ichi High Frequency Co., Ltd., Tokyo (JP)

( * ) Notice: Subject to any disclaimer, the term of this patent is extended or adjusted under 35 U.S.C. 154(b) by 0 days.

(21) Appl. No.: 17/058,448

(22) PCT Filed: May 31, 2019

(86) PCT No.: PCT/JP2019/022654
§ 371 (c)(1),
(2) Date: Nov. 24, 2020

(87) PCT Pub. No.: WO2019/230991
PCT Pub. Date: Dec. 5, 2019

(65) Prior Publication Data
US 2021/0205878 A1    Jul. 8, 2021

(30) Foreign Application Priority Data

Jun. 1, 2018    (JP) .............................. JP2018-105987

(51) Int. Cl.
*B22F 1/00* (2022.01)
*C23C 4/08* (2016.01)
*C23C 4/18* (2006.01)

(52) U.S. Cl.
CPC .............. *B22F 1/0003* (2013.01); *C23C 4/08* (2013.01); *C23C 4/18* (2013.01); *B22F 2301/15* (2013.01); *B22F 2303/20* (2013.01)

(58) Field of Classification Search
CPC .. B22F 1/003; B22F 2301/15; B22F 2303/20; B22F 1/0003; B22F 1/00; B22F 2003/248; B22F 2007/045; B22F 2202/07; B22F 2999/00; B22F 3/115; C23C 4/08; C23C 4/18; C23C 4/06; C22C 1/0433; C22C 19/05
USPC ........................................................... 75/255
See application file for complete search history.

(56) References Cited

U.S. PATENT DOCUMENTS

| | | |
|---|---|---|
| 4,594,103 A | 6/1986 | Simm et al. |
| 4,609,401 A | 9/1986 | Simm et al. |
| 2010/0189588 A1 | 7/2010 | Kawatsu et al. |

FOREIGN PATENT DOCUMENTS

| | | | |
|---|---|---|---|
| CN | 104060212 A | 9/2014 | |
| JP | 60-501664 A | 10/1985 | |
| JP | 7113144 B | * 12/1995 | ............... C23C 4/06 |
| JP | 10-176315 A | 6/1998 | |
| JP | 2000-119781 A | 4/2000 | |
| JP | 2006-161132 A | 6/2006 | |
| JP | 2006-265591 A | 10/2006 | |
| JP | 4310368 B2 | 8/2009 | |
| JP | 2015-143372 A | 8/2015 | |
| JP | 2018-076564 A | 5/2018 | |
| WO | WO 2018/088251 A1 | 5/2018 | |
| WO | WO 2018/150984 A1 | 8/2018 | |

OTHER PUBLICATIONS

CN104060212 Translation (Year: 2014).*
JP-H07113144-B (Year: 1995).*
Ambrell, Induction Heating Solutions, "About Induction Heating" (2017) (Year: 2017).*
Japan Patent Office, International Search Report in International Application No. PCT/JP2019/022654 (dated Sep. 3, 2019).
Otsuka et al., "HR11N, Minimizing Fireside Corrosion in Refuse-to-Energy Plants," *Sumitomo Metals* 46(2): 99 (1994).

* cited by examiner

*Primary Examiner* — Brian D Walck
*Assistant Examiner* — Danielle Carda
(74) *Attorney, Agent, or Firm* — Leydig Voit and Mayer, Ltd.

(57) ABSTRACT

Provided are an alloy powder having excellent environmental resistance even in an environment where corrosion and wear are active simultaneously, and an alloy coating using the powder. A Ni—Fe base alloy powder comprising Cr of 15% by mass or more and 35% by mass or less, Fe of 10% by mass or more and 50% by mass or less, Mo of 0% by mass or more and 5% by mass or less, Si of 0.3% by mass or more and 2% by mass or less, C of 0.3% by mass or more and 0.9% by mass or less, B of 4% by mass or more and 7% by mass or less, and a balance of Ni and incidental impurities.

1 Claim, 6 Drawing Sheets

2Si-4B MANUFACTURING TEST RESULTS

| % BY MASS | | Si CONTENT | | | |
|---|---|---|---|---|---|
| | | 0 | 0.3 | 2 | 4 |
| B CONTENT | 3 | | | × | ○ |
| | 4 | | × | × | |
| | 6 | × | ○ | ○ | |

MAXIMUM AMOUNT OF
THICKNESS REDUCTION
0.1 mm/SIX MONTHS

| | GROUND SIDE | LEFT SIDE |
|---|---|---|
| BEFORE USE |  | |
| AFTER OPERATION FOR 3,420 HOURS |  |  |

AMOUNT OF THICKNESS REDUCTION: 35 μm

Ni-20Cr-4Fe

AMOUNT OF THICKNESS REDUCTION: 3 μm

Ni-20Cr-30Fe-1Si-5.5B-0.5C

CROSS-SECTIONAL STEM IMAGE OF Ni-20Cr-30Fe-1Si-5.5B-0.5C

NI—FE BASE ALLOY POWDER, AND METHOD FOR PRODUCING ALLOY COATING USING SAID NI—FE BASE ALLOY POWDER

CROSS-REFERENCE TO RELATED APPLICATIONS

This patent application is the U.S. national phase of International Application No. PCT/JP2019/022654, filed May 31, 2019, which claims the benefit of Japanese Patent Application No. 2018-105987, filed on Jun. 1, 2018, which are incorporated by reference in their entireties herein.

TECHNICAL FIELD

The present invention relates to a Ni—Fe base alloy powder and a method for producing an alloy coating using the Ni—Fe base alloy powder, and particularly to a Ni—Fe base alloy powder capable of forming an alloy coating having excellent environmental resistance under a high-temperature environment where corrosion and erosion-corrosion may cause a problem, and a method for producing an alloy coating using the Ni—Fe base alloy powder.

BACKGROUND ART

In an incinerator for incinerating wastes and biomass, a harsher high-temperature corrosive environment is formed due to chlorine contained in the fuels. Particularly, on the surface of a heat exchanger, at which the temperature is lower than the ambient temperature, chloride contained in the atmosphere is concentrated and deposited. Thus, severe corrosion occurs on the surface. In the case of a fluidized bed boiler, in addition to corrosion, wear due to a fluidized medium may act to cause a severe thickness reduction. As a measure for such thickness reduction, a protector is attached. Attaching a protector is effective but may lower the heat transfer efficiency in heat exchangers. For this reason, as a thickness reduction measure, surface treatment such as thermal spraying or build-up welding may be often used.

Common issues of thermal spray coating include formation of pores in the coating, weak adhesion to the substrate, and the like. High Velocity Oxygen Fuel (HVOF) thermal spraying, in which the particle velocity on thermal spraying is enhanced, and the like can make the porosity of a coating lower than plasma spraying. However, complete elimination of the pores cannot be achieved. The coating is merely physically bonded to the substrate, and thus the adhesive property is low. Then, a self-fluxing alloy spraying method has been used, wherein the coating is remelted after thermal spraying to enable formation of a metallurgical reaction layer between the coating and the substrate and elimination of the pores in the thermal spray coating, thereby markedly improving the characteristics of the thermal spray coating. Self-fluxing alloy spraying, which reduces the pores in the coating by virtue of the remelting treatment to enable prevention of penetration of corrosive substances, is known to impart excellent corrosion resistance. However, the composition of self-fluxing alloy powders that can be used for self-fluxing alloy spraying is restricted. Self-fluxing alloys are required to have a melting point of 1,000° C. or less and to have a wide temperature range between the liquidus and the solidus. An excessively high melting point makes melting difficult. Moreover, there is a concern that raising the temperature up to the melting temperature may thermally affect the base material. Meanwhile, when the temperature range is narrow, it is difficult to control the temperature on the remelting treatment, and thus it is unlikely to form a coating of a good quality.

The most commonly used self-fluxing alloy powder is SFNi4 (2.14 A NiCrCuMoBSi 6915 3 3 A) specified in JIS H8303: 2010. SFNi4 is a Ni—Cr alloy composed of Cr: 12 wt % to 17 wt %, Mo: 4 wt % or less, Si: 3.5 wt % to 5.0 wt %, Fe: 5 wt % or less, C: 0.4 wt % to 0.9 wt %, B: 2.5 wt % to 4.0 wt %, Co: 1 wt % or less, Cu: 4 wt % or less, and a balance of Ni. SFNi4 is an alloy excellent in corrosion resistance and wear resistance because of having corrosion resistance in a wide range of environments as well as having a high hardness of 50 to 60 HRC. SFNi4 is also excellent in applicability (remelting treatment) and thus has been used in a wide range of fields. Alloys obtained by modifying SFNi4 and the like also have been suggested for specific applications.

For example, there are suggested a self-fluxing Ni base alloy powder having suppressed fluidity during a remelting treatment, the alloy being composed of Cr: 10 wt % to 16.5 wt %, Mo: 4.0 wt % or less, Si: 3.0 wt % to 5.0 wt %, Fe: 15.0 wt % or less, C: 0.01 wt % to 0.9 wt %, B: 2.0 wt % to 4.0 wt %, Cu: 3.0 wt % or less, O: 50 ppm to 500 ppm, and a balance of Ni and incidental impurities and satisfying Si/B: 1.2 to 1.7, and a component excellent in corrosion resistance and/or wear resistance, the component having a coating formed of this self-fluxing Ni base alloy powder by a thermal spraying method (Patent Literature 1).

There is also suggested a self-fluxing Ni base alloy powder composed of Cr: 12 wt % to 17 wt %, Mo: 3 wt % to 8 wt %, Si: 3.5 wt % to 5.0 wt %, Fe: 5.0 wt % or less, C: 0.4 wt % to 0.9 wt %, B: 2.5 wt % to 4.0 wt %, Cu: 4.0 wt % or less, O: 200 ppm or less, and a balance of Ni and incidental impurities and satisfying 0 ppm≥−20Mo %+100 (Patent Literature 2).

There is further suggested a self-fluxing Ni base alloy powder for thermal spraying composed of Cr: 30.0 wt % to 42.0 wt %, Mo: 0.5 wt % to 2.0 wt %, Si: 2.0 wt % to 4.0 wt %, Fe: 5.0 wt % or less, C: 2.5 wt % to 4.5 wt %, B: 1.5 wt % to 4.0 wt %, and a balance of Ni and incidental impurities (Patent Literature 3). There is disclosed that this self-fluxing Ni base alloy powder for thermal spraying is produced by an atomization method, chromium carbide having a particle size of 5 μm or less is uniformly precipitated inside the particles, and a high-temperature erosion property is improved.

There is furthermore suggested a corrosion-resistant and wear-resistant heat transfer tube for heat exchange where a protective coating is formed on the outer surface of its iron-based metallic tube, the coating being composed of a self-fluxing Ni base alloy including Cr: 12 wt % to 17 wt %, Mo: 4 wt % or less, Si: 3.5 wt % to 5.0 wt %, Fe: 5.0 wt % or less, C: 0.4 wt % to 0.9 wt %, B: 2.5 wt % to 4.5 wt %, and Cu: 4.0 wt % or less (Patent Literature 4).

However, conventional self-fluxing Ni base alloys cannot be said to have sufficient environmental resistance for Erosion-Corrosion where corrosion and wear simultaneously occur, and moreover, have a disadvantage of a high material cost because of including a large amount of expensive Ni.

Meanwhile, it is known that use of inexpensive Fe as the primary component makes a remelting treatment difficult because the melting point of the alloy rises. No self-fluxing alloy based on Fe exists in the JIS standards, and an Fe base alloy is generally used as build-up welding. Build-up welding, which has a large heat input on application and has large thermal influence on the substrate, may cause deformation and the like.

There is suggested, as an Fe base alloy for build-up, a low carbon-high silicon-high chromium-boron-niobium-type corrosion-resistant and wear-resistant iron base alloy composed of Cr: 15 to 31 wt %, Mo: 10 wt % or less, Si: 2.5 to 4.5 wt %, C: 0.5 to 2.0 wt %, B: 0.5 to 3.5 wt %, Mn: 10 wt % or less, Cu: 7 wt % or less, Ni: 16 wt % or less, Nb+V: 8 wt % or less, and a balance of Fe and incidental impurities and having a mixing ratio between Cr and (Si×B) that satisfies a specific relation (Patent Literature 5). This alloy, in which carbide is precipitated to enhance hardness and thus wear resistance, and simultaneously, corrosion resistance is exerted by virtue of Cr in the base material, is characterized by being excellent both in wear resistance and corrosion resistance. The alloy is also characterized by its lower material cost than that of Ni base alloys because of its low content of Ni. However, in a high-temperature environment including Cl such as in a refuse incinerator, Ni has been confirmed to contribute to an improvement in the corrosion resistance. Also in light of a suggestion that HR11N (28.5Cr-40Ni-1Mo-0.15N) is expected to exert corrosion resistant performance in a severe high-temperature corrosive environment in which adhesion of meltable combustion slag including chlorides/sulfates may occur (Non Patent Literature 1), the corrosion resistance of the alloy having a low content of Ni of Patent Literature 5 can be expected to be insufficient in a high-temperature environment including Cl. In fact, the alloy shown in Patent Literature 5 has been subjected to evaluation of its corrosion resistance in an aqueous solution, and no corrosion resistance data in a high-temperature environment including Cl are shown. It is considered that the corrosion resistance of the alloy disclosed in PL5 is insufficient at such a high temperature.

Most of alloys mentioned for corrosion resistance and wear resistance are claimed to be excellent in any one of corrosion resistance and wear resistance. There is substantially no alloy whose characteristics are described under an erosion-corrosion environment where the both resistances should be simultaneously active.

CITATION LIST

Patent Literature

PTL 1: Japanese Patent Laid-Open No. 2015-143372
PTL 2: Japanese Patent Laid-Open No. 2006-265591
PTL 3: Japanese Patent Laid-Open No. 2006-161132
PTL 4: Japanese Patent Laid-Open No. 2000-119781
PTL 5: Japanese Patent No. 4310368

Non Patent Literature

NPL 1: Otsuka, Kudo, Natori, "HR11N, Minimizing Fireside Corrosion in Refuse-to-Energy Plants", Sumitomo Metals, Vol. 46, No. 2, P. 99 (1994)

SUMMARY OF INVENTION

Technical Problem

It is an object of the present invention to provide an alloy powder having excellent environmental resistance even in an environment where corrosion and wear are active simultaneously, and an alloy coating using the powder.

Solution to Problem

According to the present invention, there is provided a Ni—Fe base alloy powder including Cr of 15% by mass or more and 35% by mass or less, Fe of 10% by mass or more and 50% by mass or less, Mo of 0% by mass or more and 5% by mass or less, Si of 0.3% by mass or more and 2% by mass or less, C of 0.3% by mass or more and 0.9% by mass or less, B of 4% by mass or more and 7% by mass or less, and a balance of Ni and incidental impurities.

According to the present invention, there is also provided a method for producing an alloy coating, the method comprising: thermally spraying a Ni—Fe base alloy powder including Cr of 15% by mass or more and 35% by mass or less, Fe of 10% by mass or more and 50% by mass or less, Mo of 0% by mass or more and 5% by mass or less, Si of 0.3% by mass or more and 2% by mass or less, C of 0.3% by mass or more and 0.9% by mass or less, B of 4% by mass or more and 7% by mass or less, and a balance of Ni and incidental impurities to form an alloy coating; and then subjecting the alloy coating to a remelting treatment to metallurgically bond the alloy coating with a substrate and lower the porosity in the alloy coating.

Generation of nodular precipitates on the alloy coating surface is preferably controlled by adjustment of the heating temperature during the remelting treatment.

As the remelting treatment, high-frequency induction heating to heat the alloy coating from the substrate side of the alloy coating is preferably used.

In the present invention, a "base material" means a matrix of a Ni—Fe base alloy, and a "substrate" means a member having a surface to be thermally sprayed by the Ni—Fe base alloy powder to form a coating.

Advantageous Effects of Invention

An alloy powder of the present invention, which includes inexpensive Fe at a high concentration, has a lower material cost than that of a common self-fluxing Ni base alloy, can maintain a self-fluxing property, and can markedly reduce thermal effect on a base material during application in comparison with building-up. According to the present invention, in a severe high-temperature corrosive environment or erosion-corrosion environment in which chloride is involved, such as in an incinerator for wastes and biomass or a boiler, the life of a heat transfer tube and the like can be extended without severely compromising heat transfer efficiency like a protector. As a result, it is possible to provide an incinerator or boiler that has a higher apparatus operation rate by extending the life of members without lowering the heat exchange efficiency of the heat transfer tube.

DESCRIPTION OF EMBODIMENTS

Figure 1:
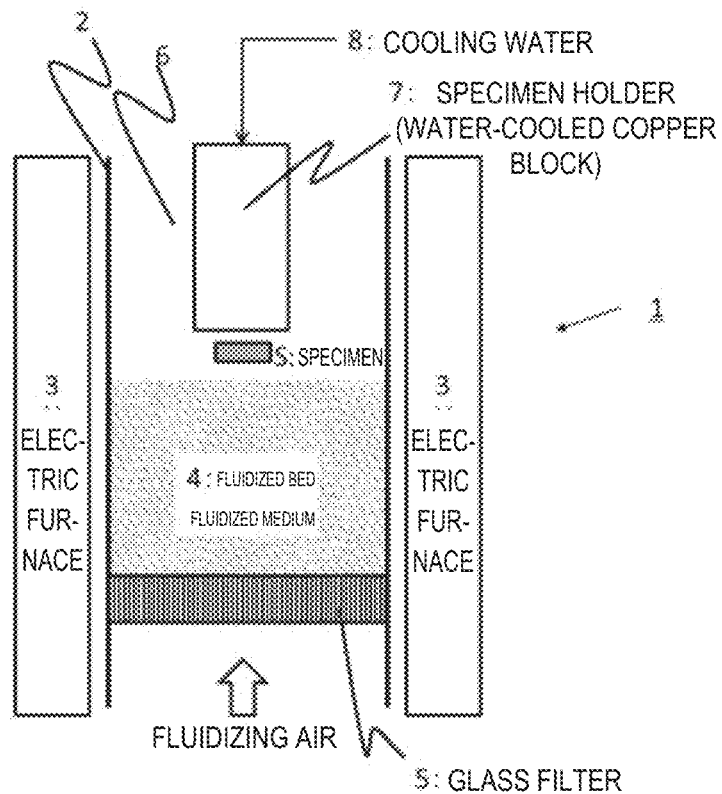
FIG. 1 is a schematic view of a compact fluidized bed test apparatus used in Example 1 to evaluate erosion-corrosion properties.

A Ni—Fe base alloy powder of the present invention includes Cr of 15% by mass or more and 35% by mass or less, Fe of 10% by mass or more and 50% by mass or less, Mo of 0% by mass or more and 5% by mass or less, Si of 0.3% by mass or more and 2% by mass or less, C of 0.3% by mass or more and 0.9% by mass or less, and B of 4% by mass or more and 7% by mass or less, and a balance of Ni and incidental impurities. Each element in the alloy composition of the present invention will be described below.

[Cr: 15% by Mass or More and 35% by Mass or Less]

The Ni—Fe base alloy powder of the present invention includes Cr of 15% by mass or more and 35% by mass or less, preferably of 18% by mass or more and 22% by mass or less. Cr is a critical element for maintaining the corrosion resistance at high temperature. With a Cr content of less than 15% by mass, sufficient corrosion resistance cannot be achieved. Cr forms precipitates with B or C (Cr boride and Cr carbide) to enhance the hardness of the coating and thus improve the wear resistance. In contrast, an excessively large Cr content leads to deterioration in the coating applicability due to a rise of the melting point, and thus the upper limit is preferably 35% by mass.

[Fe: 10% by Mass or More and 50% by Mass or Less]

The Ni—Fe base alloy powder of the present invention includes Fe of 10% by mass or more and 50% by mass or less. It is known that Fe is generally inferior in corrosion resistance to Ni and is much inferior in chlorination corrosion properties at high temperatures to Ni, in particular. However, from the corrosion test results mentioned below, it found that, in the case where the partial pressure of chlorine included is low, inclusion of Fe more improves the corrosion resistance, and in the case where Fe of 10% by mass or more is included, the erosion-corrosion resistance is markedly improved. With an excessive increase in the Fe content, however, the corrosion resistance in a high chlorine partial pressure environment markedly deteriorates, and the applicability decreases due to a rise of the melting point. Thus, the upper limit is preferably 50% by mass.

[Mo: 0% by Mass or More and 5% by Mass or Less]

The Ni—Fe base alloy powder of the present invention includes Mo of 0% by mass or more and 5% by mass or less. In a chlorination corrosive environment as represented by refuse incinerators, Alloy 625 containing Mo of 9% by mass is known to exert excellent corrosion resistance. As a result of conducting the corrosion test mentioned below, however, it found that, when the Mo content is 7% by mass in the Ni—Fe base alloy of the present invention, the corrosion resistance deteriorates conversely. Further, with an increased Mo content, the applicability also deteriorated. Meanwhile, with respect to the erosion-corrosion resistance, a decrease in the Mo content resulted slight suppression of the amount of thickness reduction. When importance is placed on the applicability and erosion-corrosion resistance, the Mo content is preferably suppressed to 0% by mass or more and 3% by mass or less, and when importance is placed on the corrosion resistance, the Mo content is preferably 3% by mass or more and 5% by mass or less.

[C: 0.3% by Mass or More and 0.9% by Mass or Less]

The Ni—Fe base alloy powder of the present invention includes C of 0.3% by mass or more and 0.9% by mass. C, which forms hard Cr carbide, is generally used for improving the hardness of thermal spray coatings. A precipitation phase mainly containing Cr carbide protrudes to lessen wear to which the Ni—Fe base material is subjected, contributing to an improvement in the erosion-corrosion resistance. With a C content of less than 0.3% by mass, precipitation of a Cr carbide phase is insufficient. When the C content exceeds 0.9% by mass, however, Cr in the Ni base material is excessively consumed as carbide, and thus, the corrosion resistance deteriorates.

[B: 4% by Mass or More and 7% by Mass or Less]

The Ni—Fe base alloy powder of the present invention includes B of 4% by mass or more and 7% by mass or less and preferably of 5% by mass or more and 6% by mass or less. B is a critical element for applicability (remeltability) as well as forms Cr boride in the alloy of the base material to thereby contribute to hardening of the alloy. When an alloy in which Cr boride is formed is exposed to a corrosive environment, a corrosion product is formed on the base material which is a metal. Here, due to involvement of wear, the corrosion product is damaged, and the corrosion rate increases. As a result, thickness reduction of the base material is facilitated. Consequently, Cr boride, which is hard and excellent in wear resistance, protrudes, and is preferentially subjected to collision of a fluidized medium. As a result, it is considered that the wear conditions to which the base material is subjected are relaxed to suppress the amount of thickness reduction of the base material. However, when the B content is excessively large, the consumption of Cr as boride increases. Thus, the corrosion resistance of the base material deteriorates, and the base material becomes excessively hard and brittle. Accordingly, the upper limit of the B content is preferably 7% by mass. Although a Cr carbide functions similarly, it is Cr boride that mainly functions in the Ni—Fe base alloy of the present invention.

[Si: 0.3% by Mass or More and 2.0% by Mass or Less]

The Ni—Fe base alloy powder of the present invention includes Si of 0.3% by mass or more and 2.0% by mass or less, preferably 0.5% by mass or more and 1.5% by mass or less. Si is known to contribute to an improvement in oxidation resistance. However, as a result of the erosion-corrosion resistance test and corrosion test mentioned below, it was found that, when the Si content is excessively high, erosion-corrosion resistance deteriorates, and the corrosion resistance deteriorates in an environment containing a small amount of chlorine. With a Si content of less than 0.3% by mass, it was found that the applicability (remelting treatment) is poor, remelting is insufficient, and thus a sufficiently dense coating cannot be formed.

Next, advantages of alloy coatings that can be formed with the Ni—Fe base alloy powder of the present invention will be described.

An issue in the case of forming an alloy coating on a substrate is the adhesion between the substrate and the alloy coating. If pores are present in the alloy coating, a corrosive component penetrates the interface between the alloy coating and the substrate, and the substrate is corroded. As a result, the alloy coating is exfoliated. An example of a method for improving such exfoliation is melting the alloy to be a coating. The melting metallurgically bonds the substrate with the alloy coating to thereby enable the adhesion to be improved. Melting is also effective in reduction of the pores.

Figure 8:
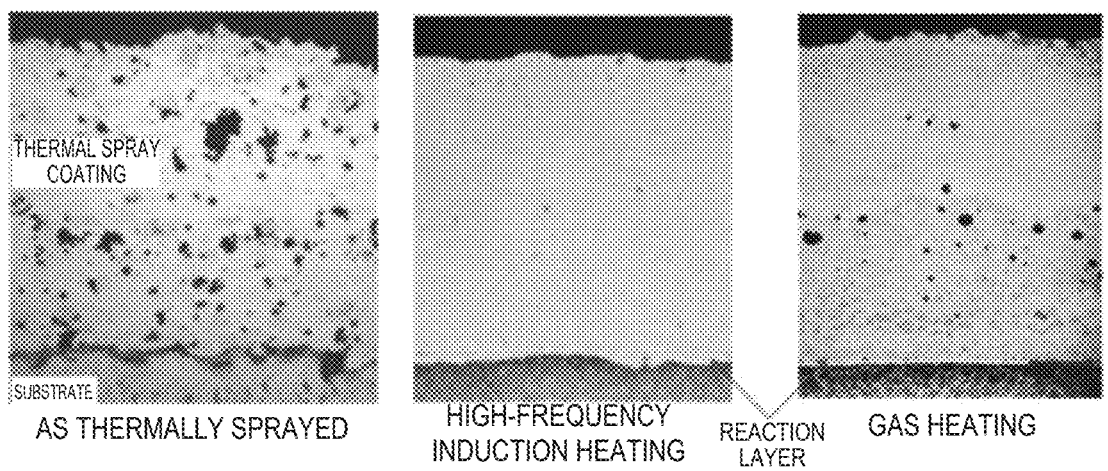
FIG. 8 is photographs showing the effects of the remelting treatment in comparison.

FIG. 8 shows cross-sectional photographs of a thermal spray coating. From the photograph on the left in FIG. 8, it can be seen that a large number of pores are present in the coating as thermally sprayed. These pores are three-dimensionally connected to the surface, enabling the corrosive component to penetrate the inside of the coating. Meanwhile, from the photographs on the center and the right in FIG. 8, pores are markedly reduced and open pores connected to the surface have disappeared, in both high-frequency induction heating (the center in FIG. 8) and gas heating (the right in FIG. 8). On the interface between the substrate and the thermal spray coating, the interface has harsh unevenness as thermally sprayed and no metallurgical connection is observed. As can be seen in the lower part of the photographs on the center and right of FIG. 8, a metallurgical reaction layer is confirmed to be present after the remelting treatment.

As a characteristic of an erosion-corrosion phenomenon, a corrosion product is continuously exfoliated due to wear to thereby facilitate thickness reduction. Thus, when the corrosion condition is markedly severer than the wear condition, the metal surface is covered with the corrosion product to lower the erosion-corrosion rate. Conversely, relaxing the wear condition to make an environment where corrosion mainly proceeds enables the erosion-corrosion rate to be lowered. When unevenness is provided on the surface of the alloy coating, the wear condition is relaxed in the recess portion of the surface, and the corrosion product is more likely to grow. Fluidized medium particles crushed and finely-divided enter the recess portion to adhere thereto and grow therein, protecting the surface of the alloy. Thus, the erosion-corrosion resistance is improved to enable thickness reduction to be prevented. The unevenness on the surface of the alloy coating may be nodular precipitates to be formed by the remelting treatment, as mentioned below.

Next, the method for producing an alloy coating of the present invention will be described.

The method for producing an alloy coating of the present invention comprises thermally spraying a Ni—Fe base alloy powder including Cr of 15% by mass or more and 35% by mass or less, Fe of 10% by mass or more and 50% by mass or less, Mo of 0% by mass or more and 5% by mass or less, Si of 0.3% by mass or more and 2% by mass or less, C of 0.3% by mass or more and 0.9% by mass or less, B of 4% by mass or more and 7% by mass or less, and a balance of Ni and incidental impurities to form an alloy coating, and then subjecting the alloy coating to a remelting treatment to metallurgically bond the alloy coating with a substrate and lower the porosity in the alloy coating.

As the remelting treatment method, typical techniques such as burner heating or a thermal treatment using an electric furnace and high-frequency induction heating can be used without limitation. In the remelting treatment in the method for producing an alloy coating of the present invention, heating is preferably performed not from the coating side, but from the substrate side. In the case of heating from the coating surface side, impurities such as oxide caught during thermal spraying may remain inside the thermal spray coating. In the case of heating from the substrate side, impurities are lifted to the surface side and can be removed from the inside of the coating. Thus, a thermal spray coating of a good quality can be formed. As a method of heating from the substrate side, high-frequency induction heating can be preferably used.

Generation of nodular precipitates on the alloy coating surface can be controlled by adjustment of the heating temperature during the remelting treatment. For example, controlling the heating temperature during the remelting treatment to 1070° C. or more and 1140° C. or less can generate nodular precipitates on the surface to thereby provide unevenness on the surface.

A relationship shown in the following Table 1 generally exists between the heating temperature and the proportion of the nodular precipitates to be generated (proportion of nodular precipitates covering the surface).

TABLE 1

Table 1 Relationship between heating temperature during remelting treatment and proportion of nodular precipitates covering surface

| Heating temperature (° C.) | Proportion of nodular precipitates (%) |
| --- | --- |
| 1140° C. or more | Less than 30% |
| 1120° C. or more and less than 1140° C. | 30% or more and less than 50% |
| 1100° C. or more and less than 1120° C. | 50% or more and less than 70% |
| 1070° C. or more and less than 1100° C. | 70% or more and less than 100% |
| Less than 1070° C. | 100% |

When the heating temperature is low, melting is insufficient, bonding among particles is low, and remaining pores increase. An excessively high heating temperature makes application difficult, and thus, a preferable remelting treatment temperature is in the range of 1070° C. or more and 1140° C. or less. The temperature is more preferably in the range of 1100° C. or more and 1120° C. or less.

The substrate on which the Ni—Fe base alloy powder of the present invention is to be thermally sprayed is not particularly limited, the substrate may include metals requiring a normal alloy coating. Particularly, when the Ni—Fe base alloy powder of the present invention is thermally sprayed on a heat transfer tube or the like as the substrate to be used under a severe erosion-corrosion environment, excellent erosion-corrosion resistance can be imparted to the substrate.

EXAMPLES

A compact fluidized bed test apparatus shown in FIG. 1 was used to evaluate the erosion-corrosion characteristics of Ni—Fe base alloy powders. A fluidized bed test apparatus 1 comprises a vessel 2 in which a fluidized bed 4 is formed with a fluidized medium, and an electric furnace 3 provided on the outer periphery of the vessel 2. A glass filter 5 that holds the fluidized medium and supplies fluidizing air is provided on the bottom of vessel 2. In a test section 6, which is the upper portion of the vessel 2, a specimen holder (water-cooled copper block) 7 that holds a specimen S inside or above the fluidized bed 4 is provided. To the specimen holder 7, a cooling water conduit 8 for supplying cooling water is connected.

A specimen S was attached to the specimen holder 7 of the fluidized bed test apparatus 1. The atmospheric gas and fluidized medium in the vessel 2 were kept at 700° C. using external heating by means of the electric furnace 3 and indirectly cooled with cooling water supplied to the specimen holder 7 to thereby cool the surface of the specimen S to 350° C. A temperature gradient was provided between the atmosphere and the specimen S to reproduce the heat transfer tube environment of an actual apparatus. Up to three specimens S can be set to the specimen holder 7 at a time. The flow conditions of the fluidized bed 4 was changed by air supplied from bottom of the fluidized bed 4 and chloride was further mixed in the fluidized medium to thereby reproduce a corrosive environment.

[Experiment 1] Erosion-Corrosion Characteristics

To comprehend erosion-corrosion behavior, an erosion-corrosion test using the fluidized bed test apparatus 1 was conducted. For comparison, a corrosion test and a hardness measurement were also conducted. In the erosion-corrosion test, as the fluidized medium, a salt of 0.5% by mass (25 wt % NaCl-25 wt % KCl-50 wt % $CaCl_2$ mixed salt (hereinbelow, mixed salt 1)) was added to silica sand having an average particle size of 0.45 mm. The amount of air supplied for forming the fluidized bed was set to 25 L/min, and an amount of air corresponding to 2.5 Umf ratio was allowed to flow, and the test was conducted for 250 hours.

The specimen thickness before and after the test was measured using a laser thickness gauge, and the amount of erosion-corrosion (μm) was determined as the difference between the specimen thickness before the test and the specimen thickness after the test.

In the corrosion test, separately, the mixed salt 1 was disposed on the gas upstream side of a tubular furnace and the specimen S was disposed on the downstream side of the tubular furnace through which air was allowed to flow such that the gas transfer rate reached 1 mm/sec. The tubular furnace was heated to 550° C., which is equal to or higher than the melting temperature of the mixed salt 1. The specimen S was heated and retained for 100 hours in an environment where a portion of the mixed salt 1 disposed on the upstream side, as chloride vapor, reached the portion at which the specimen was disposed, and the corrosion weight gain ($mg/cm^2$) was determined from the weight increase.

The Vickers hardness was additionally measured. The specimen S was produced by arc melting of alloys in which Mo content was changed from 0% by mass to 7% by mass on the basis of Ni-20Cr-4Fe as the model alloy.

The test results are listed in Table 2.

An excellent result of the amount of erosion-corrosion was achieved with a lower Mo content. Meanwhile, the corrosion weight gain decreased as the Mo content increased. However, it was found that, in Ni-20Cr-4Fe-5Mo (wt %), the corrosion weight gain was minimized, and in Ni-20Cr-4Fe-7Mo (wt %), the corrosion weight gain was enhanced and the corrosion resistance deteriorated, conversely.

As for the hardness (Hv), the specimen having a higher Mo content was harder. In general, a harder material is more excellent in wear resistance, and thus, it can be said that an alloy having a higher Mo content is more excellent in wear resistance.

From the above results, the alloys containing Mo of 5% by mass or more and 7% by mass or less resulted in excellent corrosion resistance and wear resistance, but the alloys having a lower Mo content resulted more excellent erosion-corrosion resistant characteristics. In other words, the alloys excellent in erosion-corrosion resistant characteristics and the alloys excellent in corrosion resistance and wear resistance are different in material characteristics. In order to evaluate an alloy excellent in erosion-corrosion resistance, it can be said that evaluation on erosion-corrosion itself is required. From the experiment results above, it is obvious that erosion-corrosion resistance cannot be evaluated via the evaluations made separately on the corrosion resistance of and on the wear resistance of the alloys disclosed in the prior citations.

TABLE 2

Table 2 Results of erosion-corrosion and corrosion tests on Ni—20Cr—Fe model alloys

| Alloy | Amount of erosion-corrosion (μm) | Corrosion weight gain (mg/cm$^2$) | Hardness (Hv) |
|---|---|---|---|
| Ni—20Cr—4Fe | 18.6 | 0.766 | 234 |
| Ni—20Cr—4Fe—1Mo | 19.5 | 0.382 | 246 |
| Ni—20Cr—4Fe—3Mo | 20.4 | 0.163 | 246 |
| Ni—20Cr—4Fe—5Mo | 23.2 | 0.102 | 286 |
| Ni—20Cr—4Fe—7Mo | 32.8 | 0.440 | 320 |

[Experiment 2] Evaluation of Effect of Fe on Corrosion

Figure 2:
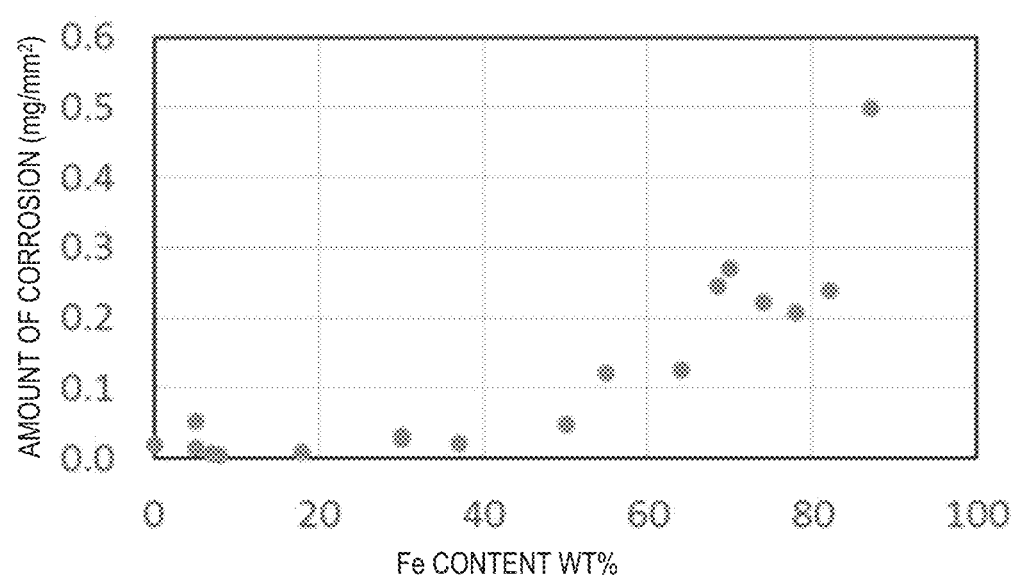
FIG. 2 is a graph of the corrosion weight loss plotted against the change in the Fe content of a Ni—Fe base alloy powder containing Cr of 20% by mass, showing the dependency of the Fe content on embedding corrosion test results.

The specimen S was embedded in the mixed salt 1 used in Experiment 1, and a corrosion test on a Ni-20Cr—Fe alloy was performed at 450° C., which is equal to or lower than the melting point of the mixed salt 1, for 400 hours. When the salt adhering to the specimen S was removed, a portion of the corrosion product was simultaneously removed. Thus, the corrosion product was entirely removed after the corrosion test, and the weight decrease due to corrosion (corrosion weight loss) was determined. The results of the corrosion weight loss plotted against the Fe content in the alloy are shown in FIG. 2. When the Fe content is lower than or equal to approximately 50% by mass, the corrosion weight loss values are 0.05 mg/mm$^2$ or less and within the allowable range of variation. When the Fe content exceeds 50% by mass, the corrosion weight loss values exceed 0.1 mg/mm$^2$ and abruptly increase, and it can be seen that the corrosion resistance obviously decreases.

Figure 3:
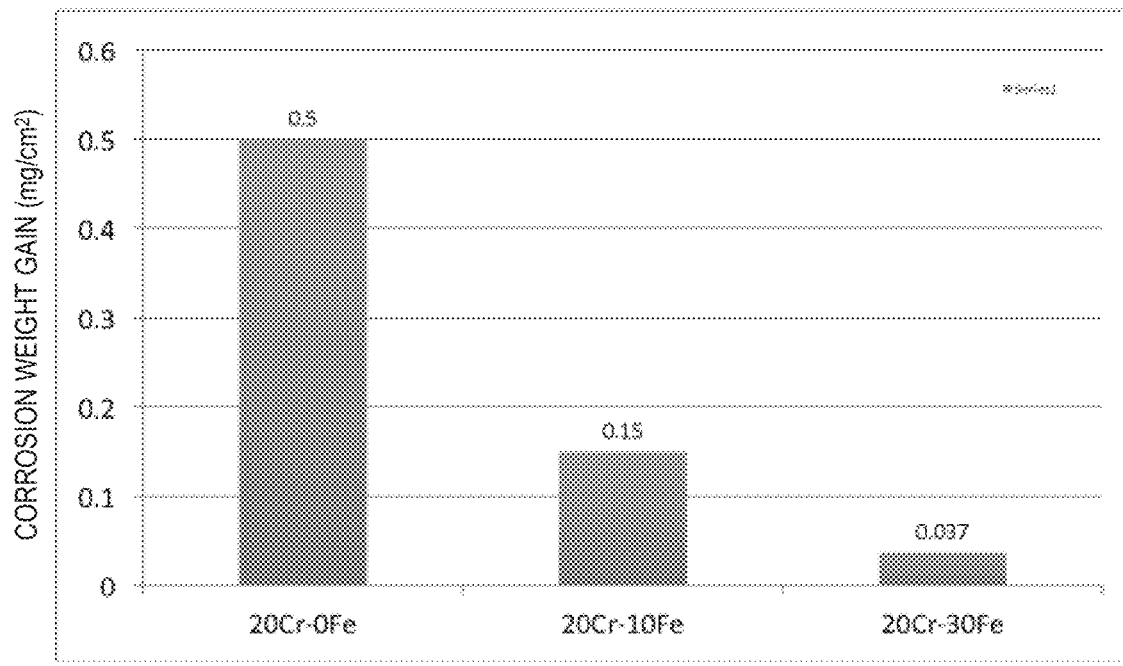
FIG. 3 is a graph of the corrosion weight gain plotted against the change in the Fe content of a Ni—Fe base alloy powder containing Cr of 20% by mass, showing the dependency of the Fe content on the results of an in-air-flow corrosion test.

Further, in order to clarify the effect of Fe, the corrosion resistance of the Ni-20Cr—Fe alloy was evaluated by the same method as for the corrosion test in Experiment 1. The results are shown in FIG. 3. As seen from FIG. 3, the corrosion weight gain decreases as the Fe content increases. It can be said that the corrosion resistance in the air flow including chloride vapor is improved as the Fe content increases.

In comparison of FIG. 2 (embedding test results) and FIG. 3 (in-air-flow test results), it is considered that the chlorine partial pressure in the atmosphere is lower in the test in the air flow including chloride vapor than in that in the embedding test. Thus, it has become obvious that, when the chlorine partial pressure is low, the corrosion resistance is improved as the Fe content becomes higher, and when the chlorine partial pressure is high, an Fe content more than 50% by mass adversely affects the corrosion resistance.

[Experiment 3] Evaluation of Effect of Fe on Erosion-Corrosion

Figure 4:
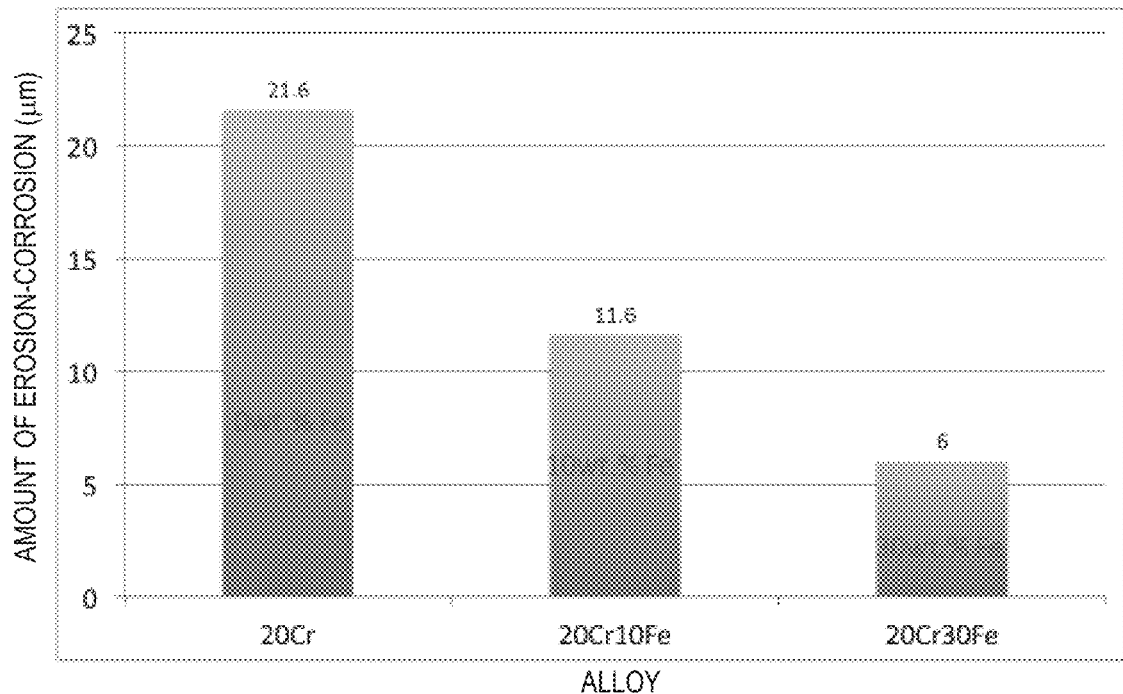
FIG. 4 is a graph of the amount of erosion-corrosion plotted against the change in the Fe content of a Ni—Fe base alloy powder containing Cr of 20% by mass, showing the dependency of the Fe content on erosion-corrosion test results.

The erosion-corrosion resistant characteristics of the Ni-20Cr—Fe alloy were evaluated using the erosion-corrosion test apparatus shown in FIG. 1 under the same conditions as in Experiment 1 while the Fe content was changed to 0% by mass, 10% by mass, and 30% by mass. The results are shown in FIG. 4. It can be seen from FIG. 4 that, as the Fe content increases, the amount of erosion-corrosion decreases, and the effect becomes significant when the Fe content exceeds 10% by mass despite a marked improvement in the erosion-corrosion resistant characteristics.

[Experiment 4] Evaluation of Effect of Si on Corrosion and Erosion-Corrosion

Figure 5:
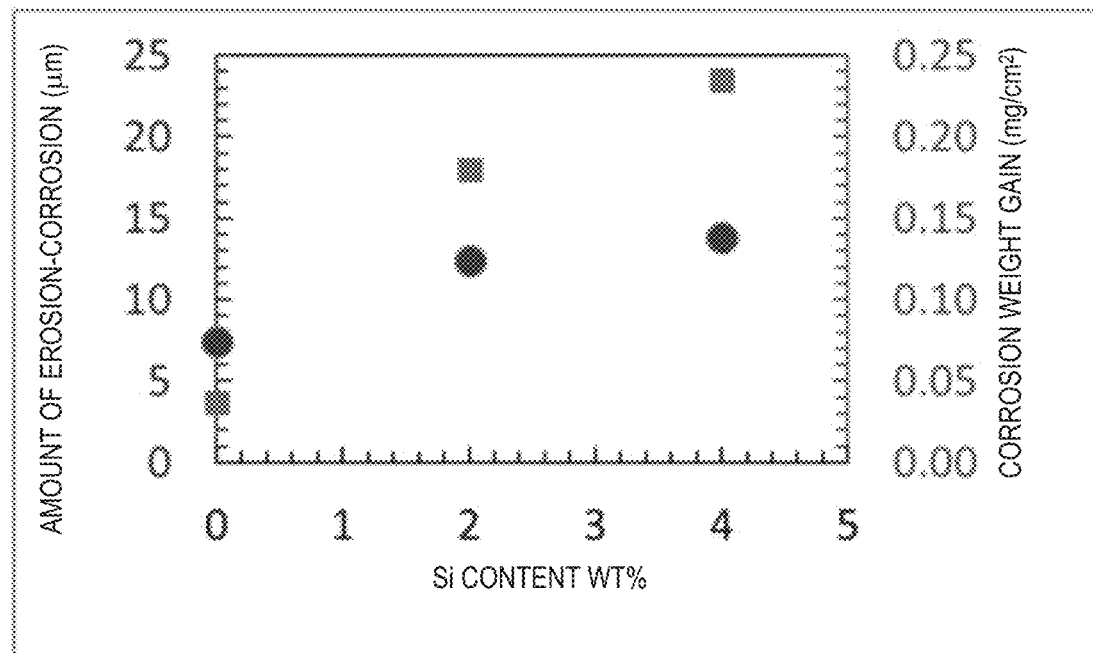
FIG. 5. is a graph of the amount of erosion-corrosion and the corrosion weight gain plotted against the change in the Si content of a Ni—Fe base alloy powder containing Fe of 30% by mass, showing the dependency of the Si content on erosion-corrosion test results.

An erosion-corrosion test and a corrosion test were conducted under the same conditions as in Experiment 1 in the air flow including chloride vapor as described above while the Si content in the Ni-20Cr-30Fe alloy was varied from 0% by mass to 4% by mass. The results obtained by evaluating the effects of Si on corrosion and erosion-corrosion are shown in FIG. 5. It was found that, as the Si content increases, both the amount of erosion-corrosion and the corrosion weight gain increases and both the erosion-corrosion resistance and the corrosion resistance deteriorate. Si is preferably not contained in view of material characteristics, but a certain amount is required for ensuring the manufacturability of thermal spray coatings.

[Experiment 5] Evaluation of effect of Cu, C and B

In order to evaluate the effect of Cu, C, and B, an erosion-corrosion test was conducted using a Ni-20Cr alloy, in which the amounts of Cu, C, and B shown in Table 3 (% by mass) were added (although not indicated in Table 3, the balance includes Ni and incidental impurities) under the same conditions as in Experiment 1. As a material for comparison, JIS-SFNi4 was used. The results are shown in Table 3. It can be seen that addition of Cu makes the amount of erosion-corrosion larger and degrades the erosion-corrosion resistance, but addition of C or B makes the amount of erosion-corrosion smaller and improves the erosion-corrosion resistance. C and B are known to bind to Cr and the like in the alloy to thereby form precipitates such as Cr carbide and Cr boride. It is considered that these precipitates improves the erosion-corrosion resistance.

Measurement of the melting point (° C.) of these alloys via TG-DTA measurement reveals that the B-containing alloys have a low melting point and that B is also effective for lowering the melting point and contributes to enhancement in the manufacturability. The findings obtained by the present experiment, which does not depend on the presence or absence of Fe, are considered to apply to Ni—Fe-type alloys.

TABLE 3

Table 3 Evaluation of effect of C and B on erosion-corrosion test

| Purpose | Cr | Mo | Fe | Si | B | C | Cu | Amount of erosion-corrosion (μm) | Melting point |
|---|---|---|---|---|---|---|---|---|---|
| Cu evaluation | 20 | 3 | | 2 | | | 4 | 76.5 | 1146 |
| B evaluation | 20 | 3 | | 2 | 5 | | | 26.8 | 978 |
| De valuation | 20 | 3 | | 2 | | 0.5 | | 24.0 | 1274 |
| SFNi4 | 15 | 3 | | 4 | 3 | 0.5 | 4 | 48.4 | 969 |

[Experiment 6] Evaluation of Effect of Si and B on Manufacturability

Figure 6:
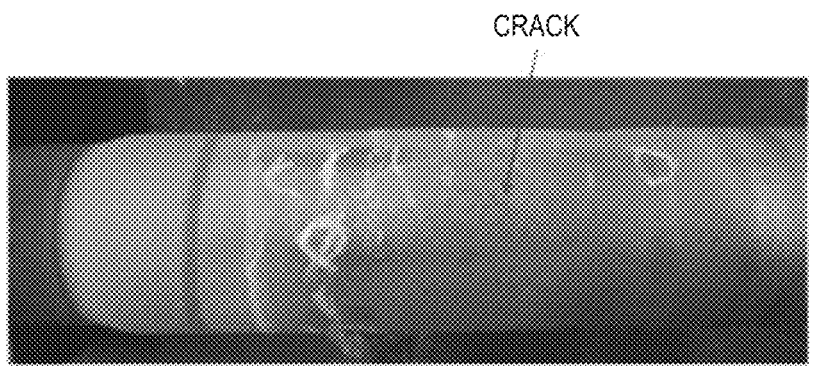
FIG. 6 shows the evaluation of the effect of Si and B on manufacturability.

When a remelting treatment is conducted after thermal spraying, it is known that the treatment is difficult if the alloy melting point is high and the range between the liquidus and the solidus is narrow. Si and B affect this manufacturability. Ni base alloy powders were produced changing the concentration of Si and B in a Ni-20Cr-10Fe-0.5C alloy and subjected to a remelting treatment after thermal spraying. Then, the manufacturability thereof was evaluated. The results, along with an appearance photograph of the test results of Ni-20Cr-10Fe-0.5C-2Si-4B, are shown in FIG. 6. Reducing Si in a material (4Si-3B) on the same level as conventional thermal spraying materials degrades the manufacturability. As can be seen in the results of the 2Si-4B alloy (alloy having a Si content of 2% by mass and a B content of 4% by mass is evaluated as "x"), cracking occurred on the coating surface during the remelting treatment, and no satisfactory coating was formed. However, it was found that, even when Si is reduced, increasing B improves the manufacturability and a satisfactory alloy coating can be formed. It was found, however, that the manufacturing was difficult without addition of Si even if the amount of B was increased and that Si of approximately 0.3% by mass was necessary.

[Demonstration Test 1] Fluidized Bed Test Apparatus Evaluation

Alloys having the composition shown in Table 4 (the content of each component is expressed in % by mass, and the balance includes Ni and incidental impurities) were produced, and the erosion-corrosion characteristics were evaluated by the methods in Experiment 1. Specimens of Nos. 1 to 10 were produced by arc melting. For specimens of Nos. 11 to 13, powders were produced, subjected to thermal spraying, and then subjected to a remelting treatment by high-frequency induction heating. It can be seen that the alloy powders of Nos. 11 to 13 each has an amount of erosion-corrosion of 10 μm or less and a corrosion weight gain of 0.200 mg/cm$^2$ or less, both of which are low, and exhibit more excellent erosion-corrosion resistance than that of Nos. 1 to 8, which contain Fe of less than 10% by mass, and of No. 9, which contains Fe of more than 50% by mass.

TABLE 4

Table 4 Erosion-corrosion test and corrosion test results

| Alloy | Cr | Mo | Fe | Si | B | C | Amount of erosion-corrosion (μm) | Corrosion weight gain (mg/cm$^2$) |
|---|---|---|---|---|---|---|---|---|
| No.1 | 15 | 3 | 3 | 4 | 3 | 0.5 | 48.4 | 0.387 |
| No.2 | 20 | 3 | 3 | 1 | 5 | 0.5 | 25.7 | 0.286 |
| No.3 | 20 | 3 | 3 | 1 | 5 | 0.5 | 25.7 | 0.286 |
| No.4 | 20 | 0.5 | 3 | 1.5 | 5 | 0.5 | 19.8 | 0.370 |
| No.5 | 20 | 0.5 | 3 | 1.5 | 6 | 0.5 | 23.6 | 0.452 |
| No.6 | 14 | 3 | 3 | 1 | 5 | 0.5 | 24.3 | 0.755 |
| No.7 | 20 | 0.5 | 3 | 2 | 5 | 0.5 | 52.7 | 0.331 |
| No.8 | 20 | 0.5 | 3 | 1 | 8 | 0.5 | 29.5 | 0.684 |
| No.9 | 20 | 0 | 60 | 1 | 6 | 0.5 | 23.1 | 0.677 |
| No.10 | 20 | 7 | 30 | 1 | 6 | 0.5 | 19.8 | 0.452 |
| No.11 | 20 | 0 | 10 | 1 | 6 | 0.5 | 7.9 | 0.189 |
| No.12 | 20 | 0 | 30 | 1 | 6 | 0.5 | 2.8 | 0.161 |
| No.13 | 21 | 1 | 28 | 1 | 6 | 0.5 | 3.1 | 0.153 |

[Manufacturing Test 1] Consideration on Remelting Treatment Method

Figure 7:
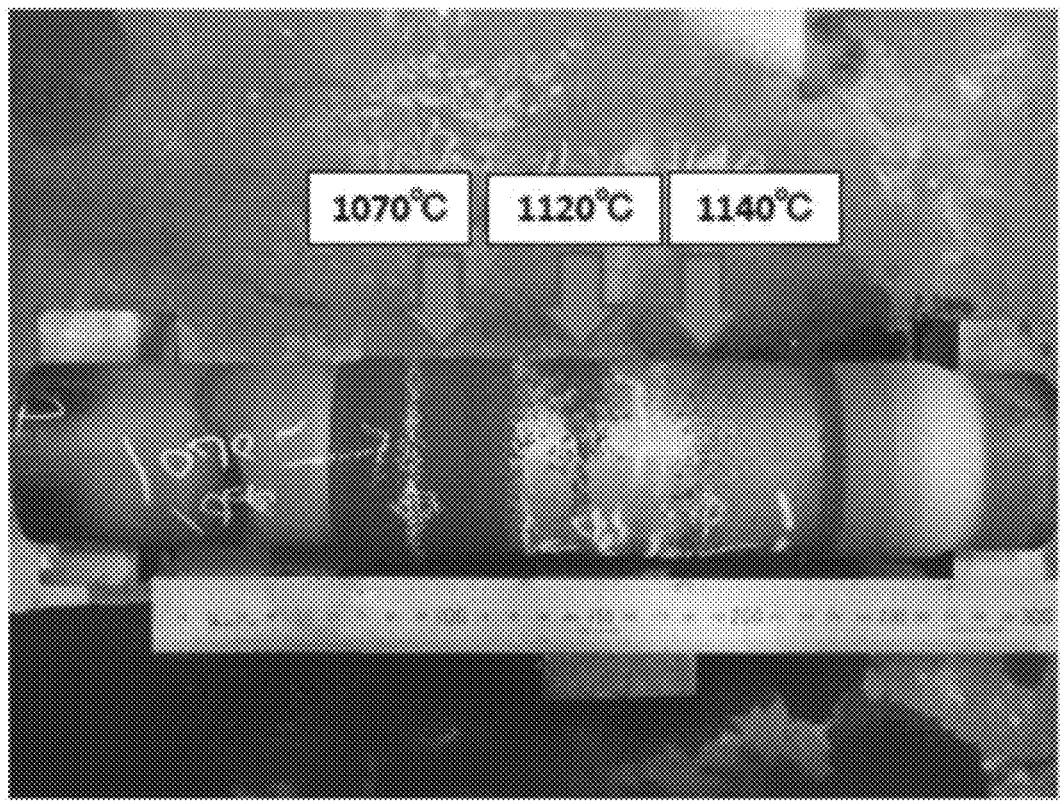
FIG. 7 is a photograph showing generation of nodular precipitates by a remelting treatment in comparison.

When the alloy powder of No. 12 was thermally sprayed and then subjected to a remelting treatment by high-frequency induction heating, it was found that nodular precipitates were generated on the surface and the surface might become uneven. After a detailed consideration on this, a remelting treatment was performed using high-frequency induction heating while the temperature was changed to 1070° C., 1120° C., and 1140° C. The results are shown in FIG. 7. It was found that nodular precipitates markedly occur with a low remelting treatment temperature (1070° C.). It was also found that the amount of nodular precipitates generated is suppressed with elevated temperatures (1120° C. and 1140° C.) and controlling the temperature condition can control the surface state.

The cross-sectional photograph of a coating subjected to a remelting treatment by gas heating, for comparison of remelting treatment methods, is shown in FIG. 8. In the coating as thermally sprayed (left in FIG. 8), a large number of pores are present in the coating, and the substrate and the thermal spray coating are merely bonded physically. When the remelting treatment is conducted as shown in the center and right in FIG. 8, the coating is alloyed to thereby improve the adhesion with the substrate. Further, in the case of high-frequency induction heating (center in FIG. 8), heating from the substrate side prevents pores and the like from remaining in the coating. In contrast, in the case of gas heating (right in FIG. 8), pores and the like may remain inside the coating because of heating from the coating side. It can be seen that the remelting treatment via high-frequency induction heating after the thermal spraying can markedly reduce pores remaining inside the coating and impart excellent corrosion resistance.

[Demonstration Test 2] Actual Apparatus Exposure Test

Figure 9:
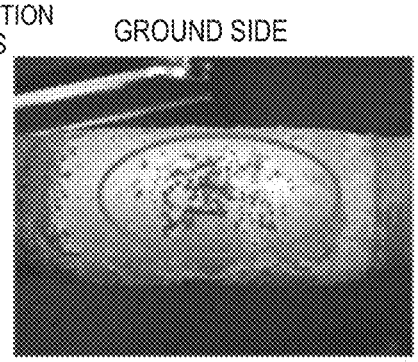
FIG. 9 is photographs showing actual apparatus exposure test results in comparison.
Figure 9:
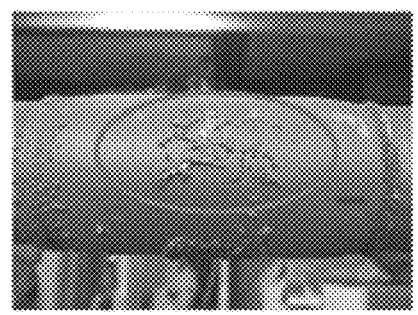
Figure 9:
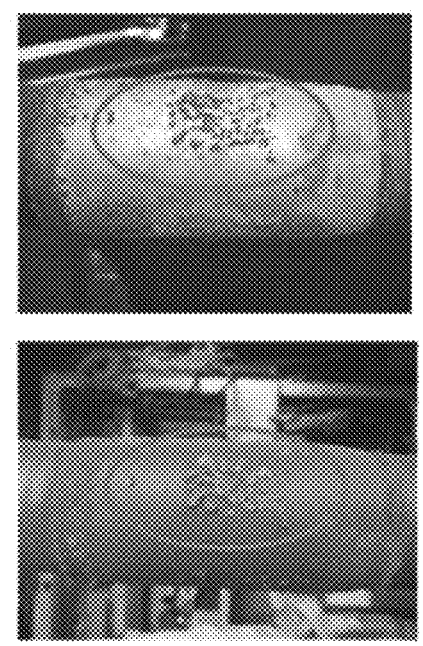

The Ni—Fe base alloy powder of the present invention (Ni-20Cr-30Fe-0.8Si-5.5B-0.5C) was used to form an alloy coating on a thermocouple protection tube for use in the fluidized bed of a fluidized bed biomass boiler as an actual apparatus, and an exposure test was conducted for about six months. The alloy coating was subjected to a remelting treatment using high-frequency induction heating after thermal spraying of the Ni—Fe base alloy powder. As a result, nodular precipitates were generated on the surface. In connection with performing thickness reduction measurement, the nodular precipitates were removed as much as possible, and the test was conducted. The results are shown in FIG. 9. In a portion where no nodular precipitate was present, the change in the thickness was measured with calipers and by ultrasonic thickness measurement. The amount of thickness reduction was as small as at most approximately 0.1 mm, and it was possible to confirm long-term durability in the actual apparatus. Meanwhile, many of the nodular precipitates present before the test were not damaged, and no thickness reduction was observed. It was possible to confirm that the coating has sufficient durability without disappearance of such surface unevenness in the actual apparatus.

[Experiment 7] Evaluation of Nodular Precipitates

Figure 10:
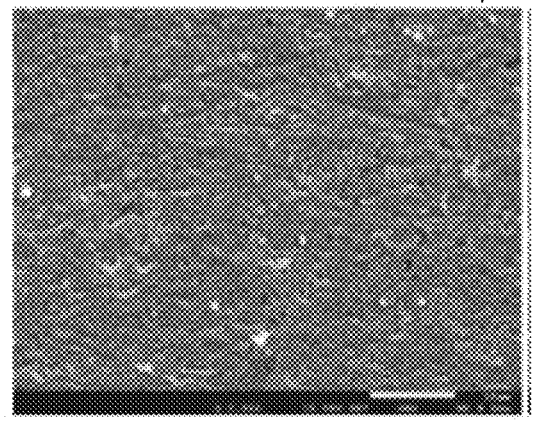
FIG. 10 is photographs of the surface of a Ni-20Cr-4Fe alloy and a Ni-20Cr-30Fe-1Si-5.5B-0.5C alloy after a erosion-corrosion test.
Figure 10:
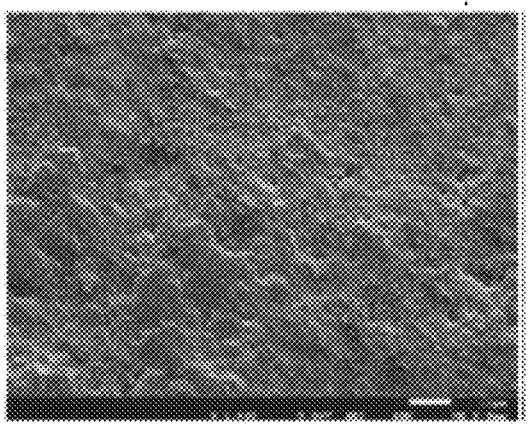
Figure 11:
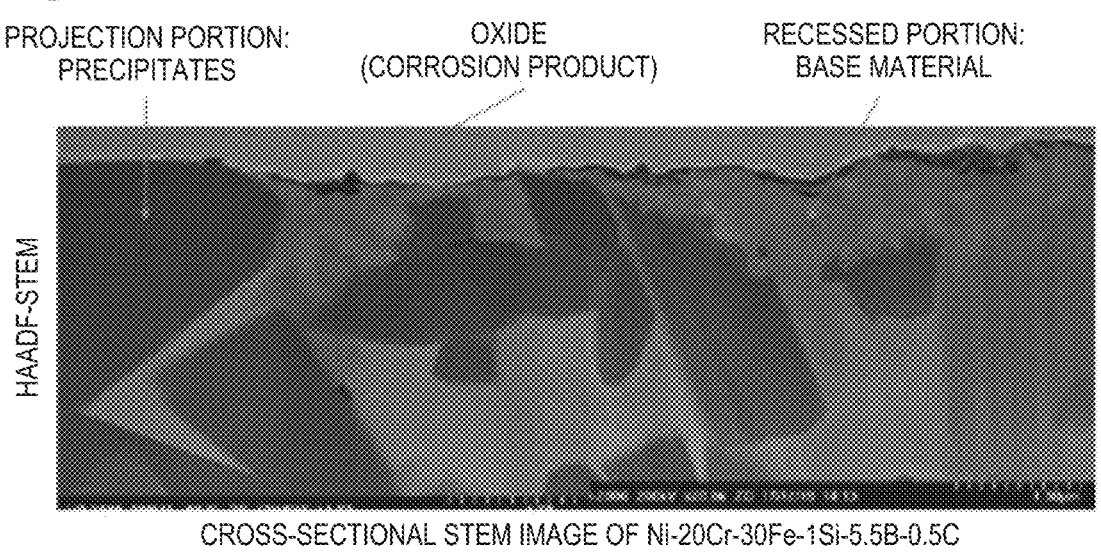
FIG. 11 is a cross-sectional STEM photograph of the Ni-20Cr-30Fe-Si-5.5B-0.5C alloy after an erosion-corrosion test.

The photograph of the post-test surface of each of the Ni-20Cr-4Fe alloy and the Ni-20Cr-3Fe-1Si-5.5B-0.5C alloy, which were subjected to a erosion-corrosion test by the same method as in Experiment 1, is show in FIG. 10. The Ni-20Cr-4Fe having a larger amount of thickness reduction had a flat surface, whereas unevenness was observed on the surface of the Ni-20Cr-30Fe-1Si-5.5B-0.5C alloy having a smaller amount of thickness reduction. The post-test cross-sectional STEM observation result of this Ni-20Cr-30Fe-1Si-5.5B-0.5C alloy is shown in FIG. 11. The projection portion is precipitates of a highly hard B compound and the like, and the recess portion, where thickness reduction proceeded, is of the base material mainly based on Ni—Fe—Cr. In the Ni-20Cr-4Fe alloy, which does not contain B and C, such precipitates are not present, and thus thickness reduction proceeded without formation of unevenness on the surface. In the Ni-20Cr-30Fe-Si-5.5B-0.5C alloy, formation of unevenness prevented thickness reduction. In fact, the detailed observation on the recess portion confirmed that the surface was covered with an oxide coating. It is considered that this oxide coating played a protective role against wear and corrosion to thereby prevent thickness reduction.

In Table 5, shown are the erosion-corrosion test results of specimens for which remelting treatment temperature for the Ni-20Cr-30Fe-1Si-5.5B-0.5C alloy was changed to thereby change the coverage by the nodular precipitates in order to demonstrate the effect of this unevenness.

TABLE 5

Table 5 Relationship between nodular precipitates and amount of thickness reduction

| Coverage by nodular precipitates | Remelting treatment temperature | Relative value of amount of thickness reduction |
|---|---|---|
| 0% | 1100° C., surface processing | 1 |
| 20% | 1150° C. | 0.92 |
| 30% | 1140° C. | 0.67 |
| 50% | 1120° C. | 0.55 |
| 70% | 1100° C. | 0.52 |
| 100% | 1070° C. | 0.53 |

The specimen having a coverage by nodular precipitates of 0% is a specimen whose surface was processed to remove the unevenness. The amount of thickness reduction cannot be directly measured with a laser thickness gauge. Thus, instead of measuring the amount of thickness reduction, the weight decrease was measured and represented as a relative value (%) assuming that the weight decrease of the specimen having a coverage by nodular precipitates of 0% is 1. With a coverage of approximately 20%, no sufficient effect can be obtained, whereas, with approximately 30%, the amount of thickness reduction decreased to approximately two thirds. As the coverage increased, the amount of thickness reduction was suppressed, and it was possible to confirm the effectiveness of providing the surface with unevenness.

INDUSTRIAL APPLICABILITY

As described above, according to the present invention, provided is a Ni—Fe base alloy powder having corrosion resistance equivalent to or higher than that of conventional products and being excellent in erosion-corrosion resistance. In a fluidized bed boiler fired on raw materials including chlorine such as biomass, the life of the apparatus can be extended by application of an alloy coating using the Ni—Fe base alloy powder of the present invention to the surface of the heat transfer tube and the like.

The invention claimed is:

1. A method for producing an alloy coating, the method comprising: thermally spraying a Ni—Fe base alloy powder comprising Cr of 15% by mass or more and 35% by mass or less, Fe of 10% by mass or more and 50% by mass or less, Mo of 0% by mass or more and 5% by mass or less, Si of 0.3% by mass or more and 2% by mass or less, C of 0.3% by mass or more and 0.9% by mass or less, and B of 4% by mass or more and 7% by mass or less, and a balance of Ni and incidental impurities to form the alloy coating; and then subjecting the alloy coating to a remelting treatment at a temperature range from more than 1080° C. to 1140° C. or less using high-frequency induction heating to metallurgically bond the alloy coating with a substrate and lower the porosity in the alloy coating to generate nodular precipitates on an alloy coating surface with a coverage of 30% or more and less than 100%.

* * * * *